J. J. COLLINS.
Current Water-Wheel.

No. 222,457. Patented Dec. 9, 1879.

Attest:
R. F. Barnes.
Jas. A. Payne.

Inventor:
Joshua J. Collins.
by Geo. W. Dyert & Co
Attys.

UNITED STATES PATENT OFFICE.

JOSHUA J. COLLINS, OF SOUTH BEND, INDIANA.

IMPROVEMENT IN CURRENT WATER-WHEELS.

Specification forming part of Letters Patent No. 222,457, dated December 9, 1879; application filed May 19, 1879.

*To all whom it may concern:*

Be it known that I, JOSHUA J. COLLINS, of South Bend, in the county of St. Joseph and State of Indiana, have invented new and useful Improvements in Current Water-Wheels; and I do hereby declare that the following is a full and exact description of the same, reference being had to the accompanying drawings, and to the letters of reference marked thereon.

The object of my invention is to produce a current water-wheel which can be used in a running stream without the expense of building a dam, and so that the power can be conveniently and cheaply utilized for agricultural or manufacturing purposes, the wheel being so constructed that its capacity can be increased or diminished without disturbing the connection with the machinery to be driven, and so that it can be adjusted to any unevenness of the bed of the stream, and can be raised and lowered bodily to operate in various depths of water.

My invention therein consists in constructing a horizontal current water-wheel in sections, mounted in vertically-adjustable bearings, and having a limited movement both vertically and laterally independent of each other, whereby the wheel can be raised and lowered to operate in different depths of water, and the separate sections can be adjusted to any unevenness of the bed of the stream; in the peculiar construction of the hangers; and, further, in the combination, construction, and arrangement of the several parts of my machine, all as fully hereinafter explained.

Figure 1:
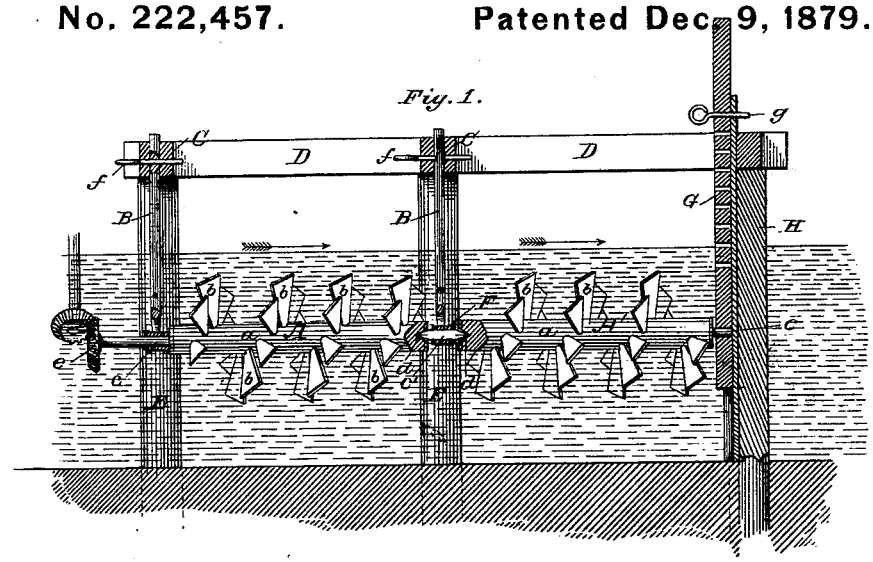
Figure 2:
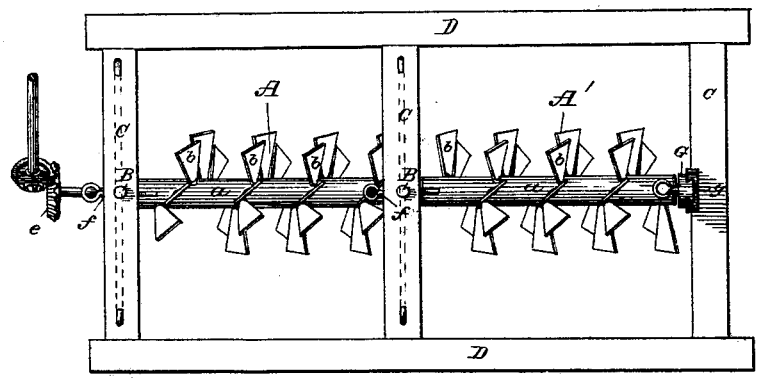
Figure 3:
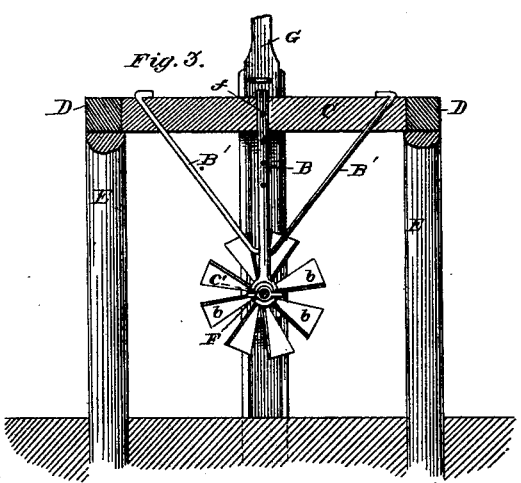

In the drawings, Figure 1 is a sectional view of the wheel and its supports, showing the wheel built in two sections; Fig. 2, a top view, and Fig. 3 a central cross-section, of the same.

My water-wheel is a long horizontal wheel constructed in sections A A', the upper section, A, being connected with the machinery to be driven, and as many lower sections, A', being added as the conformation of the stream will admit, or the power desired may require.

For convenience of illustration, only two sections are shown in the drawings. Each section is a complete water-wheel in itself, and is composed of a horizontal shaft or axle, *a*, of wood, and oblique blades *b*, also of wood.

These blades *b* are arranged, as shown, upon a spiral line running around the axle.

The sections A A' are placed together endwise and connected by a universal joint, which allows the coupled sections to work together when not arranged in line, as when it becomes necessary to move the lower sections, A', either laterally or vertically to a limited extent out of line with the upper section, or out of line with each other, on account of some unevenness of the bed of the stream.

The outer sections have metal journals, *c*, which revolve in boxes supported by hangers. The meeting ends of the sections have no projecting journals, but are provided with angular sockets *d*, in which rest the angular and tapering ends of a short coupling shaft or bolt, *c'*. This bolt or shaft *c'* rests in the box of the hanger and projects therefrom in both directions. The angular ends of the bolt have a longer taper than the sockets *d*, which allow the sections to be adjusted for a limited distance. This universal joint is also constructed so that it will be coupled by sliding the ends of the sections together against the intervening double-pointed bolt *c'*, and uncoupled by simply separating the journals, so that the sections can be readily uncoupled without disturbing the journal-boxes.

The upper section, A, is provided above its hanger with a cog-wheel, *e*, for connecting the wheel with the machinery to be driven in any convenient or well-known manner. The wheel is supported by hangers B, pendent from cross-beams C, which cross-beams are secured to longitudinal beams D, which in turn are supported by piles E. Two piles, E, are driven into the bed of the stream the proper distance apart, at points where the ends of each of the sections A A' are situated. The piles, being connected by the longitudinal and cross beams, will form a very firm support for the water-wheel.

The hangers B are rods or beams passed centrally up through the cross-beams C and held by transverse pins *f*, which can be pushed through any one of a number of holes made in the hangers, so that said hangers can be adjusted vertically in the beams. The hangers are provided with brace-rods B', which also slide through the beams C, and, while bracing the hangers, do not interfere with their vertical movement. The lower ends of the hangers B are forked, and carry between their forked ends journal-boxes F, which may be cast solid, since the journals c or coupling-shafts c' can be entered endwise therein. The outer end of the last section down the stream may be supported in a vertically-sliding bar, G, moved in dovetail ways and adjustably held to a center pile, H, by a pin, g. The wheel will be wholly submerged in the water, and will be turned by the current. The parts are constructed of wood, with just sufficient metal to make the wheel of about the specific gravity of water, so that there will be but little friction at the journals. The wheel can be raised and lowered bodily to operate in different depths of water, and the lower sections can be adjusted at an angle to the upper section, or to each other, to conform to any unevenness of the bed of the stream. The universal joints admit of this movement to a limited extent, and also allow one or more of the lower sections to be removed without disturbing the connection of the upper section with the machinery to be driven. If desired, and the size of the stream will admit, two or more of these water-wheels may be arranged side by side and be supported by the same set of piles, or by a different row of piles.

What I claim as my invention is—

1. A current water-wheel constructed in sections mounted in vertically-adjustable bearings, and having a limited movement, both vertically and laterally, independent of each other, substantially as described, for the purpose set forth.

2. In a current water-wheel, the piles E, driven in the bed of the stream, the cross-beams C, the hangers B, vertically adjustable in the cross-beams by holes and pins, and the brace-rods B', in combination with the sectional current water-wheel, for supporting the same from the bed of the stream, substantially as described and shown.

3. In a current water-wheel, the center pile, H, and the sliding bar G, vertically adjustable on the pile by holes and a pin, for supporting the lower end of the wheel, constructed and arranged substantially as described and shown.

4. The current water-wheel constructed in independent sections coupled together by universal joints, in combination with the supporting-piles and cross-beams, the adjustable hangers, the lower center pile, and adjustable bearing, constructed and arranged substantially as described and shown.

This specification signed and witnessed this 25th day of March, 1879.

JOSHUA J. COLLINS.

Witnesses:
H. K. WILKINSON,
JOHN WALKER.